United States Patent [19]

Rottner et al.

[11] Patent Number: 5,267,043
[45] Date of Patent: Nov. 30, 1993

[54] FILM GATE APPARATUS FOR A VIRTUAL CONTACT COLOR FILM SCANNER

[75] Inventors: Bruce E. Rottner, Rochester; Alan R. Nugent, East Pembroke; Deborah M. Dawson, Rochester; William B. Scott, Jr., Bergen, all of N.Y.

[73] Assignee: Eastman Kodak Company, Rochester, N.Y.

[21] Appl. No.: 749,817

[22] Filed: Aug. 26, 1991

[51] Int. Cl.$^5$ .................................... H04N 5/253
[52] U.S. Cl. ........................... 358/214; 358/216
[58] Field of Search ........................ 358/214–216, 358/75–80, 471–473, 498

[56] References Cited

U.S. PATENT DOCUMENTS

| | | | |
|---|---|---|---|
| 3,856,987 | 12/1974 | McMann et al. | 358/216 |
| 4,296,438 | 10/1981 | Stemme et al. | 358/214 |
| 4,783,700 | 11/1988 | Nagane | 358/213.11 |
| 4,875,102 | 10/1989 | Poetsch | 358/216 |
| 4,882,657 | 11/1989 | Braun | 361/412 |
| 4,947,450 | 8/1990 | Billiotte et al. | 382/68 |
| 4,974,096 | 11/1990 | Wash | 358/214 |
| 5,067,020 | 11/1991 | Funston | 358/215 |

FOREIGN PATENT DOCUMENTS

| | | |
|---|---|---|
| 0261027 | 3/1988 | European Pat. Off. . |
| 62-125768 | 11/1987 | Japan . |
| 63-120554 | 5/1988 | Japan . |
| 1-148570 | 6/1989 | Japan . |
| 3-003553 | 1/1991 | Japan . |

Primary Examiner—Stephen Brinich
Attorney, Agent, or Firm—Francis H. Boos, Jr.

[57] ABSTRACT

Film gate for a virtual contact scanner includes a base having a precision site adapted to receive a solid-state scanner assembly so as to position the sensor photosites at a precise spacing from the film image plane. A separate circuit board carrying control circuits for the scanner assembly is clamped over the scanner with contact terminals aligned with mating input/output terminals of the scanner assembly. Preferably the scanner terminals are aligned with open slots in the substrate and electrical contact is made between the scanner and circuit board terminals by means of compressible electrically conductive pads. Clamping force is concentrated over the region of electrical contact between the circuit board and scanner terminals to assure good electrical contact.

7 Claims, 2 Drawing Sheets

FILM GATE APPARATUS FOR A VIRTUAL CONTACT COLOR FILM SCANNER

FIELD OF INVENTION

This invention relates to photographic film scanners and more particularly to apparatus utilizing solid-state image scanning devices, such as linear array charge coupled devices (CCD), as a virtual contact scanner whereby image pixel information is sensed without the use of focussing optics between the film and the solid state scanning device.

BACKGROUND

The use of solid state scanners in photographic film scanning apparatus is well known. For example, in the CLAS 35 manufactured and sold by Eastman Kodak Company, assignee of the present application, color exposure analysis of film images is performed at a scanner station in which light transmitted through a film strip is focussed onto a linear CCD array by means of optical lenses. The CLAS 35 is a large scale, high speed photographic printer in which the space between the film and the CCD scanner device that is required to accommodate an optical focussing lens system is not of particular concern. In copending commonly assigned application Ser. No. 618,532—Bender et al, filed Nov. 26, 1990, entitled "Exposure Determining Color Film Scanning Apparatus for a Photofinishing System" a solid state scanner is disclosed in which the optical lens system is eliminated and the solid state CCD scanning device is maintained in virtual contact with the film as the film passes through the scanner film gate. By "virtual contact" is meant that the CCD photosites of the scanner are nearly in contact but may be spaced fractionally away from the film image by the housing in which the CCD photosites are enclosed and to avoid physical contact that might damage the film and/or the CCD scanner device. The result of employing virtual contact scanning is a much smaller system suitable for small photographic printers of the minilab and desktop variety.

A concern with the design of a virtual contact scanner of the type described in the above Bender et al application is the need to establish and maintain precise spacing of the CCD arrays from the film image plane. It is typical to mount CCD devices on a printed wiring board which includes the scan control and readout circuits needed to operate the CCD. This requires close control of the manufacturing tolerances on the printed wiring board which is costly and not practical for this application. Additionally, repair and replacement of board mounted scanners can be a problem in terms of maintaining a precise repeatable spacing relationship of the scanner device to the film image plane.

It is therefore an object of this invention to provide a compact, low-cost film scanner apparatus utilizing solid state scanner devices.

It is a further object of the invention to provide for simple and inexpensive mounting of a solid state sensor array in the film gate apparatus of a virtual contact type of scanner in which the spacing of the array from the film image plane is easily and repeatably achieved without the need for intricate adjustments.

SUMMARY OF THE INVENTION

In carrying out the objects of the invention there is provided film gate apparatus for a color film virtual contact scanner of the type in which a plurality of parallel linear scanning arrays, each associated with a selected color to be scanned, are spaced a predetermined distance from a film image plane to respond directly to discrete pixels in the film image without interposition of focussing optics. The apparatus of the invention comprises a generally planar film gate base having a film track on one side with a film gate opening defining a film image plane and having on the other side, a site for receiving a scanner assembly. A scanning aperture is also provided between the receiving site and the film gate opening. The film gate apparatus further includes a solid-state scanner assembly having a substrate and a parallel linear array of image pixel sensors, the sensor array being mounted on the substrate with the substrate being positioned on the receiving site so as to position the sensor array in the scanning aperture at the predetermined distance from the film image plane. The scanner assembly also includes sensor array electrical terminals accessible on the opposite side of the substrate from the sensor array. The film gate apparatus next includes a printed circuit board which carries sensor array control circuits and is positioned adjacent the terminal-accessible side of the substrate. The circuit board is provided with control circuit contact terminals which are aligned with the sensor array electrical terminals. Finally, the film gate apparatus includes clamping means operative to hold the scanner assembly and the printed circuit board in place on the film gate base with the contact terminals of the circuit board in electrical contact with the sensor array electrical terminals.

DETAILED DESCRIPTION

Figure 1:
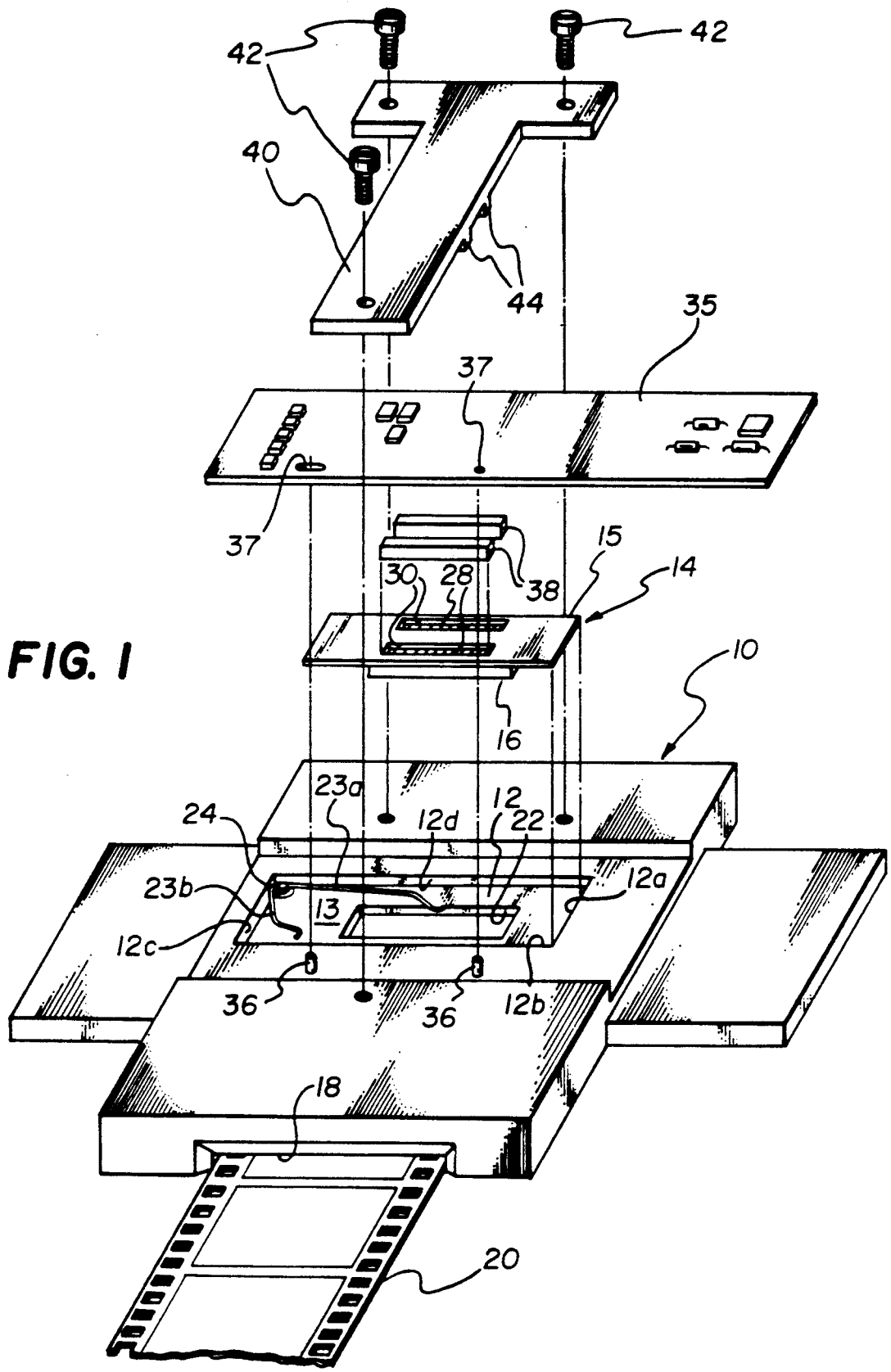
FIG. 1 is an exploded perspective view of solid state film scanner apparatus of the present invention.
Figure 2:
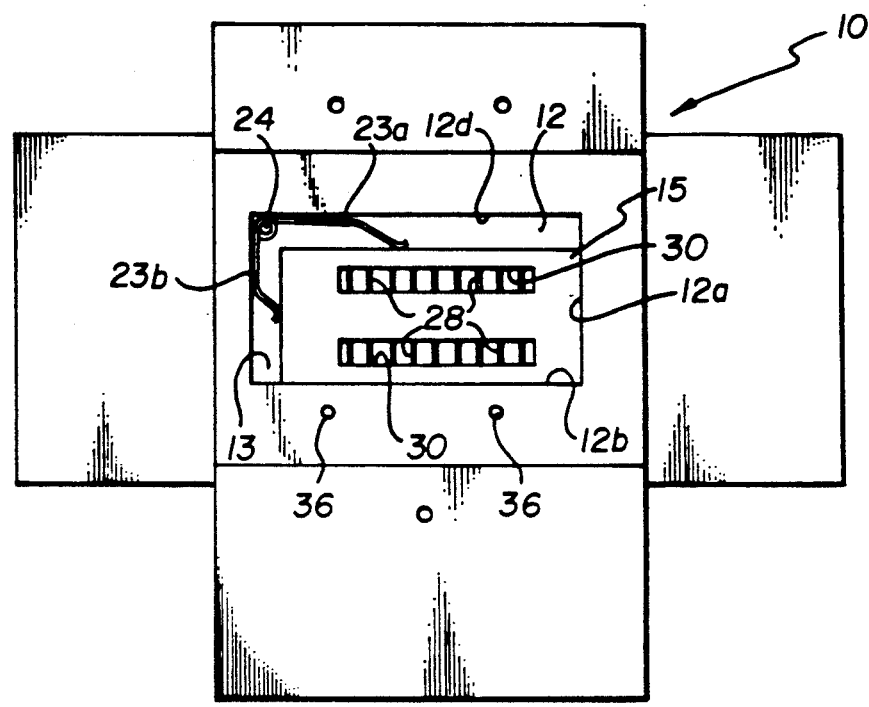
FIG. 2 is a top plan view of a portion of the scanner apparatus of FIG. 1.
Figure 3:
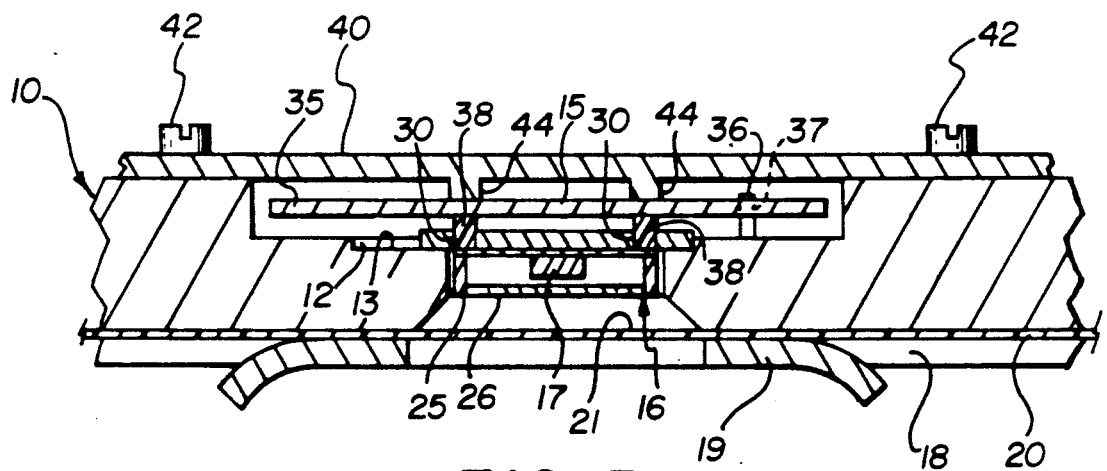
FIG. 3 is a cutaway side elevation of the scanner apparatus of FIG. 1.

Referring jointly to FIGS. 1-3, film gate apparatus of the invention comprises a generally planar film gate base 10 having a recess 12 on the upper side of base 10 and a film track 18 on the lower side with a scanning aperture 22 providing an open communication between the recess 12 and the film track 18. Recess 12 defines a site for receiving a solid state scanner assembly 14 comprised of a substrate 15 and a sensor array unit 16. Film track 18 and platen 19 guide film 20 through the gate apparatus and define a film image plane 21 at the opening to scanning aperture 22.

Recess 12 is preferably precision machined into base 10 so that the horizontal face 13 of the recess is spaced from image plane 20 by a precise, known distance. Correspondingly, recess 12 is bounded by upstanding walls 12a-d with mutually orthogonal walls 12a and 12b serving as reference stops to establish precise lateral positioning of scanner assembly substrate 15. Springs arms 23a, 23b mounted on a retainer post 24 serve to urge substrate 15 against the reference stop edges 12a and 12b.

Sensor array unit 16 includes a trilinear array 17 comprised of three parallel rows of CC sensor photosites as shown and described in the aforementioned Bender et al application, the disclosure of which is incorporated herein by reference. The linear array is enclosed in a housing 25 provided with a window 26 which is preferably coated with an IR coating to reduce the sensitivity of the sensor photosites to any undesired IR radiation such as might be emitted by the scanner light source (not shown). In the manufacture of the sensor array assembly 14, the sensor unit 16 can be mounted readily on substrate 15 with the sensors of trilinear array 17 precisely spaced from the undersurface of substrate 15. Thus when base 15 is positioned in recess 12 against the lower recess surface 13, the sensors of trilinear array 17 are easily and precisely positioned at the desired spacing from film plane 21.

Electrical terminals 28 of sensor unit 16 are coupled to input/output leads of the CCD sensor array 17 and are formed in a pair of rows on the upper base of the sensor array housing 25. Substrate 15 is made of a nonconductive material such as a ceramic, preferably either a high or low fired co-ceramic. Also, the substrate is preferably filled with a black pigment to reduce reflection within the scan gate apparatus. Substrate 15 is provided with a pair of open slots 30. With the sensor array unit 16 mounted on the underside of substrate 15, the electrical terminals 28 of the sensor array unit 16 are arranged in alignment with the slots 30 so as to thereby make the terminals 28 accessible on the opposite side of the substrate from the sensor array unit 16.

A printed circuit board 35, which carries the control circuits for operating the CCD sensor array, is positioned on the film gate base 10 adjacent the upper, or terminal accessible side, of the sensor array base substrate 15 and is provided with a pair of rows of control circuit contact terminals (not shown) which are adapted to mate with the sensor terminals 28 and, for this purpose, are aligned with the rows of terminals 28. In the illustrated preferred embodiment of the invention electrical contact between the sensor array terminals and the circuit board contact terminals is provided by a pair of compressible electrically conductive pads 38 which fit within the slots 30 of the sensor array base substrate 15. These pads are known in the art and are typically made of a nonconductive elastomer having a myriad of vertically extending conductive threads which provide electrical connection between directly opposed areas on the upper and lower surfaces of the pads without short circuiting adjacent terminals in the respective terminal rows.

A clamping plate 40 spans the printed circuit board 35 and is secured to the upper side of the film gate base 10 by means of threaded fasteners 42 to hold the scanner assembly 14 and the printed circuit board 35 in place on the film gate base 10. Circuit board 35 is positioned laterally on the base 10 by means of studs 36 and mating positioning holes 37 with the contact terminals of the circuit board 35 in electrical contact with the sensor array electrical terminals 28 and the compressible conductor pads 38 . Preferably, the clamping plate 40 is provided with laterally extending raised segments 44 that are in alignment with the rows of electrical terminals on circuit board 35 and with the compressible conductor pads 38 to provide positive clamping force at the points of electrical contact between the terminals on the circuit board 35 and the scanner assembly 14 while at the same time holding both the board and the assembly in place on the film gate base 10.

It will be appreciated from the foregoing that what has been described is a film gate apparatus for virtual contact scanning that has the advantage of being compact, and easily assembled and in which precise spacing of a solid-state sensor from the film image plane is readily achieved and maintained without the need for intricate adjustment. Moreover, by mounting the solid-state sensor array on the intermediate substrate separately from the circuit board on which the sensor array control circuits are carried, either the sensor array or the circuit can easily be replaced independently resulting in less costly repair.

The invention has been described in detail with particular reference to a presently preferred embodiment, but it will be understood that variations and modifications can be effected within the true spirit and scope of the invention.

What is claimed is:

1. Film gate apparatus for a color film virtual contact scanner in which a plurality of scanning arrays, each associated with a selected color to be scanned, are spaced a predetermined distance from a film image plane to respond directly to discrete pixels in the film image without interposition of focussing optics, the film gate apparatus comprising:

a generally planar film gate base having a film track on one side with a film gate opening defining a film image plane and on the other side, a site for receiving a scanner assembly, and having a scanning aperture between the receiving site and the film gate opening;

a solid-state scanner assembly including a substrate and an array of solid-state image pixel sensors, the sensor array being mounted on the substrate, said substrate being positioned on said receiving site with said sensor array positioned within said scanning aperture at said predetermined distance from the film image plane, the scanner assembly also including sensor array electrical terminals accessible on the opposite side of the substrate from the sensor array;

a printed circuit board carrying sensor array control circuits and being positioned adjacent the terminal-accessible side of said substrate, said circuit board having control circuit contact terminals aligned with the sensor array electrical terminals;

and clamping means operative to hold the scanner assembly and printed circuit board in place on the film gate base with the contact terminals of the circuit board in electrical contact with the sensor array electrical terminals.

2. The film gate apparatus of claim 1 wherein said scanner assembly receiving site is comprised of a recess with upstanding sides, at least one of which forms a reference position stop, said scanner substrate is positioned within said recess and the film gate apparatus further includes spring means for urging said scanner substrate against said reference position stop.

3. The film gate apparatus of claim 2 wherein said recess includes a pair of mutually orthogonal sides forming a right angle position stop, said scanner substrate is rectangular in shape, and said spring means includes a pair of spring fingers engaging orthogonal edges of the scanner substrate to urge the substrate against the right angle position stop of the recess.

4. The film gate apparatus of claim 1 wherein said scanner substrate includes apertures aligned with said sensor array electrical terminals through which the sensor terminals are accessible, and the film gate apparatus further includes compressible electrically conductive pads positioned in the substrate apertures to provide electrical contact between the sensor terminals and the contact terminals of the printed circuit board.

5. The film gate apparatus of claim 4 wherein said compressible pads also comprise compression means holding the scanner assembly substrate in position against the film gate base.

6. The film gate apparatus of claim 5 wherein said clamping means comprises a pressure plate which spans the printed circuit board and is affixed to the film gate base on opposite sides of the board, the pressure plate further including raised segments abutting the printed circuit board in alignment with said compressible pads.

7. The film gate apparatus of claim 6 wherein said raised segments of the pressure plate comprise points of clamping pressure against the printed wiring board.

* * * * *